July 31, 1934.  J. DE MOOY  1,968,284
FLUID CONTROLLING VALVE
Filed July 11, 1932
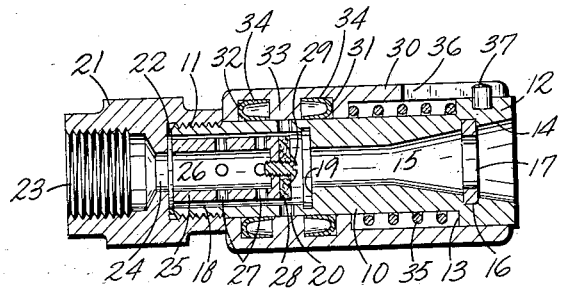
Fig. 1
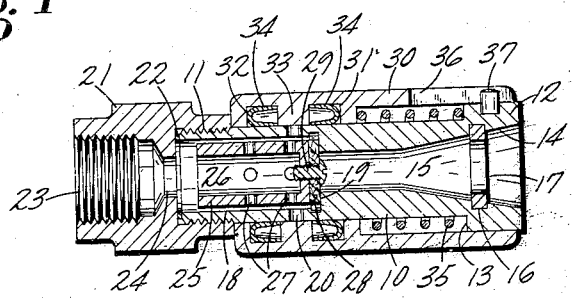
Fig. 2
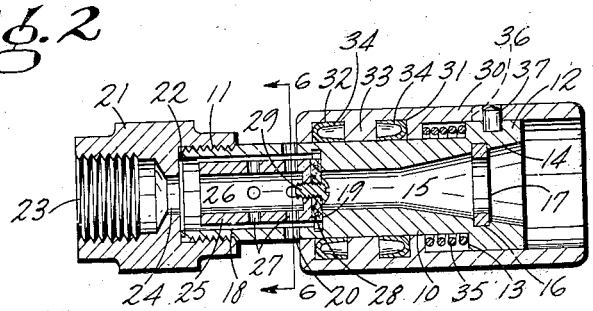
Fig. 3
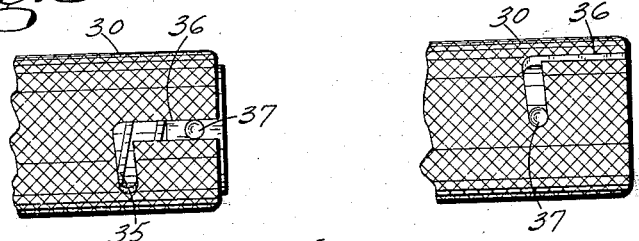
Fig. 4    Fig. 5
Fig. 6
JOHN DE MOOY
INVENTOR
BY John E. Renfer
ATTORNEY Patented July 31, 1934

1,968,284

UNITED STATES PATENT OFFICE 1,968,284

FLUID CONTROLLING VALVE

John De Mooy, Cleveland, Ohio

Application July 11, 1932, Serial No. 621,899

15 Claims. (Cl. 277—61)

This invention pertains broadly to fluid controlling valves but more particularly to valves for controlling the admission and exhaust of the pressure fluid employed for actuating lifts, jacks, or the like.

In gasoline stations, garages, or similar places where air lifts are in use, it has been found desirable to operate such elevating mechanism by the simple application of a blow gun which is commonly used in such places, thus reducing the number of pressure fluid conduits, and consequently reducing the cost of installation. It is therefore an object of this invention to produce a fluid controlling valve which will admit pressure fluid to the lift by the simple introduction of a blow gun nozzle into the valve, such valve affording a perfect seal to prevent the pressure fluid to leak thereby where the blow gun is removed therefrom.

Another object of this invention is to produce a valve allowing the pressure fluid to exhaust from the lift or similar receiver without requiring the attention of the operator.

Another object of this invention is to produce a pressure fluid inlet and outlet controlling valve which is simple in design, economic of manufacture, and susceptible of easy manipulation.

Other objects more or less ancillary to the foregoing and the manner in which the various objects are attained reside in the specific construction and aggroupment of the elements peculiar to this construction, as will become apparent from a more complete examination of this specification, in the claims of which there are assembled certain specific combinations indicative of the scope and spirit of the invention.

In the drawing:

Fig. 1 is a longitudinal cross sectional view illustrating the valve in the opened position.

Fig. 2 is a view similar to Fig. 1 illustrating the valve in a closed position.

Fig. 3 is a view similar to Fig. 1 illustrating the valve in an exhausting position.

Fig. 4 is a longitudinal elevational view of a portion of the valve illustrating the locking device in inoperative position.

Fig. 5 is a view similar to Fig. 4 illustrating the locking device in operative position.

Fig. 6 is a cross sectional view taken in a plane indicated by line 6—6 in Fig. 3.

Referring to the drawing in which like symbols designate corresponding parts throughout the several views, there is shown a cylindrical member or stem 10 terminated in one direction by an external screw threaded portion 11, and in the other direction by an enlarged cylindrical portion 12, forming a shoulder 13. The stem 10 is internally machined to form a tapered orifice or tapered socket 14, in communication with the interior of the stem through a passage 15. Within the socket 14, there is provided an annular recess 16 having disposed therein an annular packing 17. Toward the left, the stem 10 is provided with an enlarged bore 18 in communication with the bore 15, and terminated by a flat bottom or shoulder forming a valve seat 19. The bore 18 is in constant communication with the peripheral wall of the stem 10 through a plurality of radially disposed apertures 20.

Secured in screw tight engagement upon the screw threaded portion 11, there is a nut 21, and interposed between this nut and the outer end of the stem 10, there is a gasket 22, the purpose of which will be explained later. The nut 21 is formed with a pipe threaded bore 23 in communication with the bore 18 through an outlet passage 24.

Loosely disposed within the bore 18 and capable of reciprocation therein, there is a cylindrical valve 25, having a bore 26 in communication with the passage 24 of the nut 21. The bore is also in constant communication with the bore 18 of the stem 10, through a plurality of radially disposed orifices 27. Adjacent the shoulder 19 and capable of engagement therewith, there is provided on the end of the valve 25, a washer gasket 28, secured thereto by a screw 29.

Reciprocably mounted upon the stem 10, there is a sleeve 30, formed with two internal annular recesses 31 and 32, disposed in spaced relation with each other to provide between them a land 33. Secured within each of these recesses, there is a U-shaped gasket 34 preferably made of rubber with the opening thereof positioned toward each other. The sleeve 30 has a shell extending over the enlarged portion 12 of the stem 10. Disposed within the shell in engagement with the sleeve 30 and the shoulder 13, there is a compression spring 35 tending to maintain the sleeve 30 toward the left or in engagement with the nut 21. The sleeve 30 is provided with an L-shaped slot 36 capable of slidable engagement with a stationary pin 37 secured within the enlarged portion 12 of the stem 10.

To the nut 21, by the medium of the threaded bore 23, may be attached a pressure fluid conduit leading to the fluid actuated lift or the like. The socket 14 is manufactured to permit the introduction of the nozzle of the blow gun. This nozzle may be introduced within the packing 17, thus affording a fluid tight joint between the blow gun and the valve.

When the sleeve 30 is positioned as illustrated in Fig. 2, and pressure fluid is admitted into the passage 15 by means of a blow gun in engagement within the socket 14, pressure fluid acts on the end of the valve 25 or on the packing 28, to move the valve 25 in the position illustrated in Fig. 1. Pressure fluid flowing into the bore 18 around the valve 25 will pass through the plurality of orifices 27 into the valve bore 26, and outlet passage 24 into the pressure fluid conduit to the fluid actuated lift. The gasket 22 interposed between the nut 21 and the outer end of the stem 10, affords a fluid tight joint between these two parts, preventing the escape of the pressure fluid around the threaded portion 11. The apertures 20 are closed by the land 33 of the sleeve 30 and any pressure fluid which may escape past this land will be arrested by the packings 34. Pressure fluid escaping past the land 33 will enter into the packings 34 to spread the lips thereof away from each other in fluid tight engagement with the sleeve 30 and stem 10, affording thereby an efficient pressure fluid sealing device.

When it is desired to maintain the lift in a stationary elevated position, the blow gun may be removed from the socket 14, or the admission of the pressure fluid into the passage 15 may be cut off. In this instance the pressure from the lift will act against the bottom wall of the valve bore 26 and shift the valve in the position illustrated in Fig. 2. The pressure fluid acting against the valve 25, will compress the packing 28 against the shoulder 19 and consequently prevent the escape of the pressure fluid. The escape of the pressure fluid through the apertures 20 is also prevented by the land 33 and packings 34 as previously explained.

When it is desired to exhaust the pressure fluid from the lift, the sleeve 30 may be moved toward the right against the tension of the compression spring 35 as illustrated in Fig. 3, and rotated into a locked position as illustrated in Fig. 5. In this position of the sleeve 30, the valve 25 is still maintained against the shoulder 19 by the pressure of the fluid acting on the other end of the valve, allowing thereby a free passage of the pressure fluid from the passage 24 into the bore 18, around the valve 25, through the apertures 20 to atmosphere. Simultaneously pressure fluid may flow into the valve bore 26, and orifices 27 into the bore 18 and exhaust to atmosphere through the apertures 20. The sleeve 30 is locked in the position illustrated in Fig. 5 by the engagement of the groove 36 over the pin 37, thus permitting the pressure fluid to exhaust without the attention of an operator.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A pressure fluid controlling valve comprising a stem having a fluid passage longitudinally therethrough, a valve within said passage subjected to the action of the pressure fluid to prevent its escape from one end of said passage to the other end but to permit its flow in the reverse direction, and means including a member movable upon said stem to allow when in one position the escape of the pressure fluid from the first mentioned end of said passage to atmosphere.

2. A pressure fluid controlling valve comprising a member having a fluid passage longitudinally therethrough forming inlet and outlet openings, a valve within said member subjected to the action of the pressure fluid to prevent the escape thereof from said outlet opening to said inlet opening but permit its flow in the reverse direction, and means including a second member movable upon said first mentioned member to allow when in one position the escape of the pressure fluid from said outlet opening to atmosphere.

3. A pressure fluid controlling valve comprising a member having a fluid passage therethrough forming inlet and outlet openings, a valve reciprocably mounted within said passage and capable of engagement with said member when subjected to the action of the pressure fluid from said outlet opening to prevent the escape thereof through said inlet opening, said valve being movable out of engagement with said member when subjected to the action of the pressure fluid from said inlet opening to allow the flow thereof through said outlet opening, and means independent of said valve adapted to permit the escape of the pressure fluid from said outlet opening to the atmosphere when said valve is in engagement with said member.

4. A pressure fluid controlling valve comprising a member having a fluid passage therethrough forming inlet and outlet openings, a valve intermediate said openings and capable of engagement with said member when subjected to the action of the pressure fluid from said outlet opening to prevent the escape thereof through said inlet opening, said valve being movable out of engagement with said member when subjected to the action of the pressure fluid from said inlet opening to allow the flow thereof through said outlet opening, and means including a second member movable upon said first mentioned member to allow the escape of the pressure fluid from said outlet opening to the atmosphere.

5. A pressure fluid controlling valve comprising a member having a fluid passage therethrough forming inlet and outlet openings, a shoulder within said passage, a valve reciprocably mounted within said passage and capable of engagement with said shoulder when subjected to the action of the pressure fluid from said outlet opening to prevent the escape of the pressure fluid through said inlet opening, said valve being movable away from said shoulder when subjected to the action of the pressure fluid from said inlet opening permitting thereby the pressure fluid to flow through said passage to said outlet opening, exhaust passages leading from said fluid passage to the atmosphere adapted to permit the exhaust of the pressure fluid from said outlet opening, and means for controlling said exhaust passages.

6. A pressure fluid controlling valve comprising a member having a fluid passage therethrough forming inlet and outlet openings, a shoulder within said passage, a valve reciprocably mounted within said passage and capable of engagement with said shoulder, means intermediate said valve and said shoulder to afford a fluid tight joint therebetween when said valve is subjected to the action of the pressure fluid from one of said openings, preventing thereby the escape of the pressure fluid through the other of said openings, said valve being movable away from said shoulder when subjected to the action of the pressure fluid from said last mentioned opening, allowing thereby the pressure fluid to flow through said passage, passages through said member through which pressure fluid from said outlet opening is free to exhaust to atmosphere, and means for controlling said exhaust.

7. A pressure fluid controlling valve comprising a member having a fluid passage therethrough forming inlet and outlet openings, said inlet opening comprising a socket capable to receive the nozzle of a blow gun, a shoulder within said passage, a pressure fluid actuated valve within said passage capable of engagement with said shoulder to prevent the flow of the pressure fluid from one of said openings to the other, said valve being shiftable and maintained out of engagement with said shoulder when subjected to the action of the pressure fluid from said socket, permitting thereby the pressure fluid to flow through said passage, and controllable means permitting the exhaust of the pressure fluid from said outlet opening to the atmosphere.

8. A pressure fluid controlling valve comprising a member having a fluid passage therethrough terminated by an inlet and an outlet opening, a shoulder within said passage, a valve in spaced relation with the wall of said passage and reciprocable therein, said valve being capable of engagement with said shoulder when subjected to the action of the pressure fluid from the outlet end of said passage preventing thereby the flow of the pressure fluid through said passage, said valve being shiftable and maintained away from said shoulder when subjected to the action of the pressure fluid from the inlet end of said passage, and ports within said valve through which pressure fluid is adapted to flow from said inlet to said outlet opening, and controllable means in constant communication with the space between the said valve and the wall of said passage adapted to permit the exhaust of the pressure fluid from said outlet opening to the atmosphere.

9. A fluid controlling valve comprising a member having enlarged and restricted bores constituting a pressure fluid passage, a shoulder formed at the intersection of said bores, a valve reciprocable within said enlarged bore, valve actuating and holding areas on said valve subjected to the action of the pressure fluid for shifting and maintaining said valve into or out of engagement with said shoulder to prevent or allow the flow of the pressure fluid through said passage, a port through said member through which pressure fluid from the outlet end of said passage may escape to atmosphere, and means cooperating with said port for opening or closing the latter.

10. A fluid controlling valve comprising a member having a pressure fluid passage therethrough, a valve seat within said passage, a valve within said member having actuating and holding areas subjected to the action of the pressure fluid for shifting and maintaining said valve into or out of engagement with said valve seat allowing or preventing thereby the flow of the pressure fluid through said passage, and means independent of said valve for controlling the escape of the pressure fluid from the outlet end of said passage to the atmosphere.

11. A fluid controlling valve comprising a member having a pressure fluid passage therethrough, a valve seat within said passage, a valve within said member having actuating and holding areas subjected to the action of the pressure fluid for shifting and maintaining said valve into or out of engagement with said valve seat allowing or preventing thereby the flow of the pressure fluid through said passage, a passage-way in constant communication with said passage on one side of said seat through which pressure fluid may escape from said passage to the atmosphere, and means for controlling said escape.

12. A fluid controlling valve comprising a member having a pressure fluid passage therethrough terminated by an inlet and an outlet opening, a valve seat within said passage, a valve within said member having actuating and holding areas subjected to the action of the pressure fluid for shifting and maintaining said valve into or out of engagement with said valve seat allowing or preventing thereby the flow of the pressure fluid through said passage, a passage-way in communication with said passage on one side of said seat through which pressure fluid may escape from said outlet opening to the atmosphere, and a second member movable to open or close said passage-way to allow or prevent said escape.

13. A fluid controlling valve comprising a member having a pressure fluid passage therethrough terminated by an inlet and an outlet opening, a valve seat within said passage, a valve within said member having actuating and holding areas subjected to the action of the pressure fluid for shifting and maintaining said valve into or out of engagement with said valve seat allowing or preventing thereby the flow of the pressure fluid through said passage, a passage-way in communication with said passage on one side of said seat through which pressure fluid may escape from said outlet opening to the atmosphere, a movable member subjected to the tension of a compression spring for normally closing said passage-way, and means for locking said movable member against the tension of said spring away from said passage-way to allow the escape of the pressure fluid past said passage-way.

14. A fluid controlling valve comprising a stationary member formed with a pressure fluid passage therethrough terminated by an inlet and an outlet opening, exhaust passages through said member, a pressure fluid actuated valve reciprocably mounted within said member for controlling the flow of the pressure fluid from one of said openings to the other, said exhaust passages being out of communication with one of said openings when the valve is in closed position, and means associated with said exhaust passages for controlling the escape of the pressure fluid therethrough.

15. A fluid controlling valve comprising a stationary member formed with an inlet and an outlet opening, exhaust passages through said member in communication with said outlet opening, a pressure fluid actuated valve reciprocably mounted within a bore uniting said openings for controlling the flow of the pressure fluid from one of said openings to the other, and manually operated means associated with said passages for controlling the exhaust of the pressure fluid therethrough from said outlet opening.

JOHN DE MOOY.